United States Patent
Hojen-Sorensen et al.

(10) Patent No.: US 8,005,156 B2
(45) Date of Patent: Aug. 23, 2011

(54) METHOD AND APPARATUS OF RECURSIVE TIME-FREQUENCY CHANNEL ESTIMATION

(75) Inventors: Pedro Hojen-Sorensen, Allerod (DK); Morten With Pedersen, Frederiksberg (DK)

(73) Assignee: Nokia Corporation, Espoo (FI)

( * ) Notice: Subject to any disclaimer, the term of this patent is extended or adjusted under 35 U.S.C. 154(b) by 756 days.

(21) Appl. No.: 12/045,534

(22) Filed: Mar. 10, 2008

(65) Prior Publication Data

US 2009/0141819 A1 Jun. 4, 2009

(30) Foreign Application Priority Data

Nov. 29, 2007 (EP) ..................................... 07023179

(51) Int. Cl.
*H04L 27/06* (2006.01)
*H04L 27/28* (2006.01)
*H04B 1/10* (2006.01)

(52) U.S. Cl. ......................... 375/260; 375/340; 375/350

(58) Field of Classification Search .................. 375/260, 375/340, 350
See application file for complete search history.

(56) References Cited

U.S. PATENT DOCUMENTS

| 2005/0105647 A1 | 5/2005 | Wilhelmsson et al. |
| 2006/0239178 A1 | 10/2006 | Svensson et al. |
| 2009/0059885 A1 * | 3/2009 | Sadek et al. ................. 370/343 |
| 2010/0202544 A1 * | 8/2010 | Osseirar et al. ............... 375/260 |

OTHER PUBLICATIONS

International Search Report and Written Opinion, PCT/IB2008/003240, Apr. 16, 2009, pp. 1-16.
Xiaodai Dong et al., "Linear Interpolation in Pilot Symbol Assisted Channel Estimation for OFDM," IEEE Transactions on Wireless Communications, IEEE Service Center, Piscataway, NJ, US, vol. 6, No. 5, May 1, 2007.

* cited by examiner

*Primary Examiner* — Don N Vo
(74) *Attorney, Agent, or Firm* — Ditthavong Mori & Steiner, P.C.

(57) ABSTRACT

An approach is provided for estimating a channel of a multi-carrier transmission by splitting an interpolation or extrapolation or smoothing of estimates into a frequency domain part and a time domain part, wherein the channel estimation unit is configured to use for both the frequency domain part and the time domain part respective recursive filters, and wherein at least one of the recursive filters is adapted to channel conditions of the multi-carrier transmission.

26 Claims, 6 Drawing Sheets

METHOD AND APPARATUS OF RECURSIVE TIME-FREQUENCY CHANNEL ESTIMATION

FIELD OF THE INVENTION

The invention, according to various embodiments, relates to communications, and particularly, to a method, apparatus, and computer program product for estimating a channel of a multi-carrier transmission such as—but not limited to—an orthogonal frequency division multiplexing (OFDM) transmission.

BACKGROUND OF THE INVENTION

In multi-carrier systems, e.g., OFDM systems, channel estimation schemes are used for coherent detection of a received signal. OFDM is based on the modulation technique of frequency division multiplexing (FDM). The OFDM technique differs from traditional FDM by having subcarriers, which are orthogonal to each other. The modulation technique used in an OFDM system helps to overcome the effects of a frequency selective channel. A frequency selective channel occurs when the transmitted signal experiences a multipath environment.

The goal of channel estimation is to estimate the time-varying channel frequency response for each OFDM symbol. The channel can be estimated by using scattered reference symbols (pilot tones) in the frequency domain. Since the reference symbols are also scattered in the time-domain, it is necessary to estimate the channel in two dimensions, in the time-domain as well as in the frequency-domain. The channel can also be represented by its impulse response instead of its frequency response and the time-varying behaviour of the impulse response can be tracked. In order to track the channel frequency response, the subcarriers with reference symbols are used to find estimates of the channel for the subcarriers at OFDM symbols without reference symbols. Firstly, the channel is estimated in the frequency direction based on all subcarriers with reference symbols. Secondly, the frequency response for each OFDM symbol is found by interpolating in the time-domain between the known estimates. Alternatively, the ordering could be reversed such that time-processing is carried out in the first step and frequency processing is carried out in the second step.

Interpolation based channel estimation can be carried out in numerous ways, e.g., by simple linear interpolation between adjacent reference symbols (e.g., pilots tones) or by fitting a polynomial function (e.g., by a least-squares method) to the sampled channel transfer function. Even though channel estimation based on simple linear interpolation is computationally tractable it tends to perform badly in channels with high frequency selectivity. A more advanced approach is to apply Wiener Filtering (or Linear Minimum Mean Square Error (LMMSE)) which relies on some statistical features of the underlying channel transfer function to be estimated (see e.g., "Two-dimensional pilot-symbol-aided channel estimation by Wiener filtering", Hoeher, P.; Kaiser, S.; Robertson, P.; Acoustics, Speech, and Signal Processing, 1997. ICASSP-97., 1997 IEEE International Conference, Volume 3, 21-24 Apr. 1997, pages 1845-1848). However, this approach tends to become computationally intractable even for moderate sized pilot sets. Also the frequency domain smoothing matrix associated to delay (transform) domain channel estimation tends to become computationally intractable to calculate or too large to store for practical purposes.

Hence, in practical implementations, in order to reduce the computational complexity of the channel estimator as well as to reduce the memory for storing pre-computed filters (see e.g., US 20050105647A1) a sliding window approach is typically adopted. However, there are limits as to how small this sliding window can be made before the performance of the channel estimator begins to degrade. This in turn means that the processing gain of the estimator is upper limited by the size of the window. Hence, in channels with large coherence bandwidth and/or large coherence time these estimators would be limited by the window size and not the characteristics of the channel.

SUMMARY

Therefore, there is a need to provide a low-complexity approach for time-frequency channel estimation.

According to an embodiment of the invention, a method comprises performing channel estimation for a multi-carrier transmission by splitting interpolation or extrapolation or smoothing of estimates into a frequency domain part and a time domain part;

using for both said frequency domain part and said time domain part respective recursive filters; and adapting at least one of said recursive filters to channel conditions of said multi-carrier transmission.

According to another embodiment of the invention, an apparatus comprises a channel estimation unit for estimating a channel of a multi-carrier transmission by splitting interpolation or extrapolation or smoothing of estimates into a frequency domain part and a time domain part, wherein said channel estimation unit is configured to use for both said frequency domain part and said time domain part respective recursive filters, and wherein at least one of said recursive filters is adapted to channel conditions of said multi-carrier transmission.

Accordingly, at least one of interpolation, extrapolation and smoothing is split up into a frequency domain part and time domain part. For both frequency domain part and time domain part a respective recursive filter or filtering operation is provided, which is adapted to the channel conditions.

The approach, according to certain embodiments, provides a computationally efficient way for performing channel estimation in multi-carrier transceiver systems, such as an OFDM based transceiver system. In a typical OFDM based transceiver system the channel transfer function is sampled at a given set of time-frequency positions known as pilot locations. The task of the channel estimator is then to infer the entire channel transfer function at some other locations in the time-frequency grid given the sampled values at the pilot locations. The approach can be used for smoothing or interpolation or extrapolation of a channel transfer function. In a specific example, the proposed filtering can be achieved by means of infinite-impulse response (IIR) poly-phase interpolation filters with complex-valued coefficients which are adapted to the channel conditions.

Furthermore, the approach for channel estimation, according to certain embodiments, is advantageous for reception cases where the signal quality (e.g., signal-to-noise ratio (SNR)) is moderate to bad. In such cases computational resources can be freed (from an otherwise computationally intensive interpolation and/or reconstruction filter) and utilized e.g., for improving the quality of the channel estimate using a data assisted approach (e.g., iterative channel estimation based on re-encoding demodulated information bits).

The estimates may be derived from raw channel estimates at predetermined pilot locations. The raw estimates may be subjected to the smoothing and the interpolation or the extrapolation may then be performed on the smoothened raw estimates. The smoothing may comprise a forward recursive smoothing of raw channel estimators.

Furthermore, the recursive filters are infinite impulse response poly-phase filters. The recursive filter for said frequency domain part may be configured to have complex valued filter coefficients.

The adapting may comprise deriving a forgetting factor of the recursive filter of the frequency domain part from at least one of a channel change rate and a channel quality parameter. The forgetting factor may be parameterized in terms of at least one of the channel change rate and the channel quality parameter.

Additionally, the adapting may comprise deriving a forgetting factor of the recursive filter of the time domain part from at least one of a coherence time and a channel quality parameter. In a particular example, at least one first and second forgetting factor may be provided for the recursive filter of the time domain part, wherein the at least one first forgetting factor may be used for smoothing between estimates in one transmission direction which are not separated by a transmission period in the other transmission direction, and the at least one second forgetting factor may be used for smoothing between estimates in the one transmission direction which are separated by a transmission period in the other transmission direction.

The interpolation or the extrapolation in the time domain may be performed on time filtered channel estimates taking into account a time-dependent phase change and/or gain change.

Further advantageous modifications are defined in the dependent claims.

BRIEF DESCRIPTION OF THE DRAWINGS

Exemplary embodiments will be described in greater detail with reference to the accompanying drawings, in which.

DESCRIPTION OF EMBODIMENTS

Figures 1A, 1B, 1C:
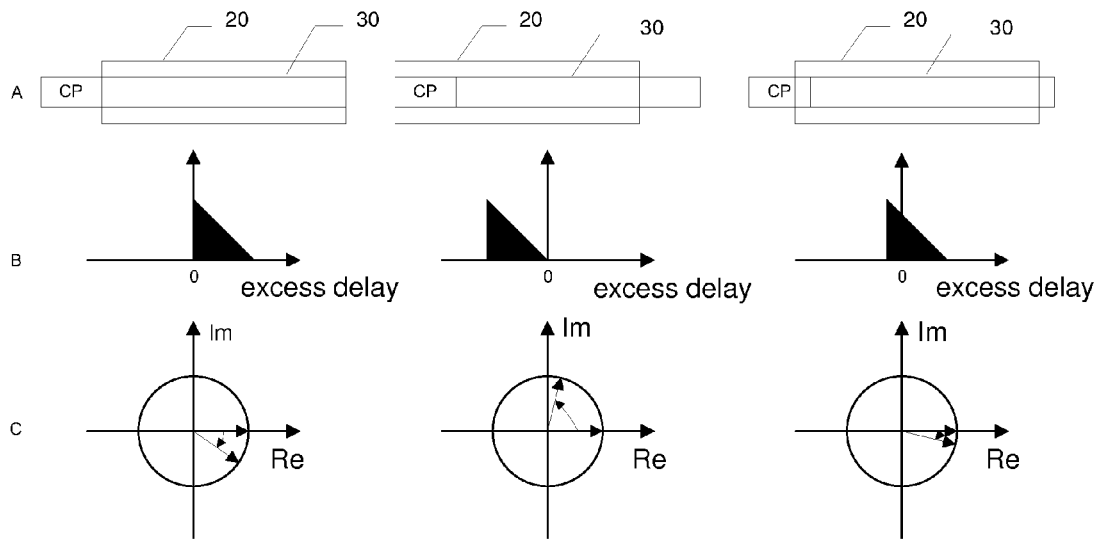
FIG. 1 shows schematic diagrams indicating an effect of changing the timing of a sliding window used for extracting a signal portion used for channel estimation, according to an exemplary embodiment.

Various embodiments will now be described based on an OFDM transceiver system as a specific example of transceiver or receiver systems in which the present invention can be implemented.

According to the embodiments described hereinafter, channel estimation procedures and apparatuses are provided, which are enhanced by resorting to adaptive recursive filtering, e.g., infinite impulse response (IIR) based filtering. This enables the channel estimator to effectively combine samples from large windows without incurring huge increases in computational complexity or memory needed to store the filter coefficients. These benefits of recursive estimation or tracking can also be obtained by using adaptive methods like least-mean-squares (LMS), recursive-least-squares (RLS) and Kalman filtering. However, in connection with channel estimation these methods have typically been used to track the temporal evolution of the channel in the delay domain. However, according to certain embodiments, recursive filtering is applied in both frequency and time domain. According to Wiener theory the optimal filter for frequency processing would in general tend to have complex valued filter coefficients due to the asymmetry of the power-delay-profile (PDP), which is per definition a function of positive excess-delay. Based on this fact it has been proposed to rotate a fast Fourier transformation (FFT) processed signal prior to frequency interpolation. This can be regarded as a first order approximation which captures linear phase changes (as a function of frequency) and which is attributed to the average group delay of the concerned transmission channel. In case the phase response is insufficiently approximated to first order, higher order interactions in the phase response should be considered. Furthermore, in practical implementations of OFDM receivers it is common to have a timing-loop which makes sure that the correct part of the received signal is picked out for further processing.

A very simple post-FFT timing estimator can be based on a single-path (PDP) assumption. Effectively, such a naïve timing estimator is configured to evaluate the phase change between consecutive sub-carriers and then move the window such that the phase change is effectively zero. Hence, the measured phase response can always be stated as a sum of the (linear) phase change attributed to a pure delay and the (in general non-linear) phase response attributed to the time-dispersion of the channel. Thus, as a secondary effect of applying the naïve timing estimator, the linear term can be removed from the channel phase response. To illustrate this, an example with a uniform PDP is assumed, where the maximum excess delay is given by $\tau_{max}$, viz.

$$PDP_{uniform}(\tau) = \frac{1}{\tau_{max}} \text{ for } \tau \in [0; \tau_{max}] \quad (1)$$

Now, assuming that a true delay d is faced, the frequency correlation function associated with the observed channel is given by:

$$R_{observed}(\Delta f) = \operatorname{sinc}(\Delta f \tau_{max})\exp(-j\pi\Delta f \tau_{max})\exp(-j2\pi\Delta f d) \quad (2)$$

$$= \operatorname{sinc}(\Delta f \tau_{max})\exp\left(-j2\pi\Delta f\left(\frac{\tau_{max}}{2} + d\right)\right)$$

The naïve (single path) timing estimate is then given by:

$$d_{naive} = -\frac{1}{2\pi\Delta f} \angle R_{observed}(\Delta f) = d + \frac{\tau_{rms}}{2} \quad (3)$$

Hence, in this case, using the timing estimate provided by the naïve timing estimator effectively renders zero the observed (post timing adjustment) phase response. Clearly, the above property holds for any rotational symmetric PDP, as the corresponding frequency correlation function can always be written as a real valued function times a rotating phasor.

Hence, using the naïve timing estimator to pick out the signal used for further processing tends to reduce the complexity of channel estimation as a secondary effect. This effect is obtained without making explicit reference to the frequency correlation function of the channel. This is contrary to earlier solutions, e.g., US20060239178A1, in which the optimal timing window is given explicitly as a function of the delay spread which then needs to be determined.

Furthermore, the phase response of the channel transfer function is in general a non-linear function of sub-carrier separation which in turn means that a pure rotation is not sufficient for rendering the optimal interpolation a real-valued function.

FIG. 1 illustrates how the perceived PDP and hence also the phase changes across sub-carriers as a result of shifting the timing of a sliding window 20, i.e., picking out different parts of the received signal 30 prior to the FFT mapping.

The upper row of panels (row A) illustrates three different choices of picking out the signal segment to be processed by FFT. The middle row of panels (row B) illustrates how the channel PDP is perceived when using the three different signal segments. The lower row of panels (row C) depicts for the three different timing definitions how the phase of the channel transfer function (CTF) changes between sub-carriers $f_0$ and $f_1$ where $f_0 < f_1$. For illustration purposes, the phase of the CTF at sub-carrier frequency $f_0$ is defined to be "0". FIG. 1 shows that the signal segment chosen to be picked out prior to FFT processing has a clear effect on the behaviour of the perceived CTF. This in turn means that the complexity of the channel estimator will be dependent on the signal segment which is picked out by the sliding window 20 for further processing. The right column illustrates the case where the signal segment/timing is set at a location where the CTF phase change between two consecutive sub-carriers is almost "0" (on average). In effect, this corresponds to a case where a naïve timing estimator was used in the receiver.

The starting point for most interpolation based channel estimators for an OFDM transceiver system is a set of (noisy) samples of the CTF evaluated at a given set of time-frequency positions $\Xi \subset \Omega$, where $\Omega$ denotes the entire time-frequency grid of interest. Typically, these samples are obtained at the given time-frequency positions $\Xi$ by transmitting a set of constellation points (so-called "pilots") which are known at the receiver side. After the FFT processing of the OFDM symbol at time t the received signal $r_{t,f}$ is obtained, where f denotes the sub-carrier index. One way of obtaining a (noisy) sample $h_{t,f}$ of the channel transfer function at a pilot location (t,f) is to divide the received signal $r_{t,f}$ with the associated pilot value $p_{t,f}$, i.e., $h_{t,f} = r_{t,f}/p_{t,f}$ for all $(t,f) \in \Xi$.

In the following it is assumed that the set of noisy samples $(h_{t,f})_{(t,f) \in \Xi}$ (so-called "raw channel estimates") of the channel transfer function is already obtained by some means. The channel transfer function is now estimated for the entire time-frequency grid of interest $\Omega$ given the raw channel estimates $(h_{t,f})_{(t,f) \in \Xi}$ at the pilot locations $\Xi$. This also includes improving the noisy estimates of the channel transfer function at the pilot locations.

In the following, IIR filtering for frequency processing is described as an example of recursive filtering. The starting point is a Wiener filtering or LMMSE problem, i.e., given a vector of observed samples v a linear mapping (or combination of weights) is to be found that provides the best estimate $\hat{h}_f$ in the MSE sense, viz.

$$\hat{h}_f = w_f^H v \quad (4)$$

A solution to this problem is given by $$w_f = \langle vv^H \rangle^{-1} \langle vh_f^H \rangle \quad (5)$$

where $h_f$ denotes the true channel transfer function at frequency f. In a standard Wiener filter the vector of observed samples contains all raw channel estimates which are available for the current pilot symbol. An approach for reducing the complexity of the standard Wiener filter is to process only a limited set of raw channel estimates in a sliding window fashion. However, in certain embodiments, it is proposed to make up the observation vector of both previous channel estimates as well as raw channel estimates.

As an example, the channel transfer function is estimated at frequency f based on the channel estimate $\hat{h}_{f-1}$ at frequency f−1 and the raw channel estimate $\tilde{h}_f$ at frequency f. In this case the vector of observed samples used for estimating the channel at frequency f is given by $$v_f = \begin{pmatrix} \hat{h}_{f-1} \\ \tilde{h}_f \end{pmatrix} = \begin{pmatrix} h_{f-1} + \eta_{f-1} \\ h_f + \varepsilon_f \end{pmatrix} \quad (6)$$

where $\eta_{f-1} \sim CN(0, \sigma_{f-1}^2)$ and $\varepsilon_f \sim CN(0, \sigma^2)$ is the prediction error associated to the channel estimate at frequency f−1 and the measurement noise, respectively. Now, the sufficient statistics needed for computing the LMMSE solution is evaluated. More specifically these are the correlation between the observations:

$$\langle v_f v_f^H \rangle = \begin{pmatrix} 1 + \sigma_{f-1}^2 & R(-1) \\ R(1) & 1 + \sigma^2 \end{pmatrix} = \begin{pmatrix} 1 + \sigma_{f-1}^2 & R^*(1) \\ R(1) & 1 + \sigma^2 \end{pmatrix} \quad (7)$$

and the correlation between the observation and the true channel transfer function, $$\langle v_f h_f^H \rangle = \begin{pmatrix} R^*(1) \\ 1 \end{pmatrix} \quad (8)$$

where the channel frequency correlation function is defined by:

$$R(\Delta f) = \langle h_f h^*_{f-\Delta f} \rangle \quad (9)$$

Hence, in this case the optimal combining weights are given by:

$$w_f = \frac{1}{(1 + \sigma_{f-1}^2)(1 + \sigma^2) - |R(1)|^2} \begin{pmatrix} 1 + \sigma^2 & -R^*(1) \\ -R(1) & 1 + \sigma_{f-1}^2 \end{pmatrix} \begin{pmatrix} R^*(1) \\ 1 \end{pmatrix}$$

$$= \frac{1}{(1 + \sigma_{f-1}^2)(1 + \sigma^2) - |R(1)|^2} \begin{pmatrix} \sigma^2 R^*(1) \\ 1 + \sigma_{f-1}^* - |R(1)|^2 \end{pmatrix} \quad (10)$$

It is noted that the estimator tends to put more emphasis on the smoothened estimates (and less to the raw channel estimates) as the frequency correlation increases (equivalent to the channel tends to become less frequency selective). The optimal combining weights hint at some important feature of the LMMSE solution. Essentially, the phase of the previously estimated channel estimate should be changed by an amount corresponding to the phase of the frequency correlation. It is worth noting that this phase change is only optimal for the first iteration, as the optimal phase change would actually be a function of the entire frequency correlation function as the recursive estimate progresses. Based on the above findings, forward recursive smoothing of the raw channel estimators can be expressed by:

$$h_{\vec{f}} = \sum_{\ell=1}^{N} \lambda_\ell e^{j\theta_\ell} h_{\vec{f}-\ell} + \lambda_0 \tilde{h}_f \text{ where } 0 \leq \lambda_\ell \leq 1 \text{ and } \sum_{\ell=0}^{N} \lambda_\ell = 1 \quad (11)$$

where a base case for forward recursion can be given by:

$$h_0^{\rightarrow} = \tilde{h}_0 \quad (12)$$

Likewise a set of backward smoothing recursions can be obtained as:

$$h_{\vec{f}}^{\leftarrow} = \sum_{\ell=1}^{N} \lambda_\ell e^{-j\theta_\ell} h_{\vec{f}+\ell}^{\leftarrow} + \lambda_0 \tilde{h}_f \text{ where } 0 \leq \lambda_\ell \leq 1 \text{ and } \sum_{\ell=0}^{N} \lambda_\ell = 1 \quad (13)$$

where a base case for backward recursion is given by:

$$h_{P-1}^{\leftarrow} = \tilde{h}_{P-1} \quad (14)$$

and P denotes the number of available raw channel estimates in the OFDM symbol. The final channel estimates can then be evaluated as some function of the two channel estimates, e.g., (not exclusively) as the average of the two estimates:

$$\hat{h}_f = \frac{1}{2}(h_f^{\rightarrow} + h_f^{\leftarrow}) \quad (15)$$

Now, a frequency interpolation part of the proposed channel estimator is described. This part can be carried out after raw channel estimates have been IIR filtered as described above. This means that the interpolation step can be performed on the smoothened channel estimates $\{\hat{h}_f\}$. An exemplary interpolation step is now considered, where only the two nearest surrounding smoothened channel estimates are used for computing the CTF. It is however straight-forward to a person skilled in the art how to extend this example to higher order interpolation. Again the starting point is the LMMSE solution to the prediction problem:

$$\hat{h}_f = w_f^H \begin{pmatrix} \hat{h}_0 \\ \hat{h}_1 \end{pmatrix} = w_f^H \begin{pmatrix} h_0 + \varepsilon_0 \\ h_1 + \varepsilon_1 \end{pmatrix} \quad (16)$$

where $\hat{h}_f$ is the estimated CTF at frequency f, $\hat{h}_0$ and $\hat{h}_1$ denotes the smoothened channel estimates, $h_0$ and $h_1$ denotes the true (but unknown) CTF and $\varepsilon_0$ and $\varepsilon_1$ denotes the estimation noise of the smoothened channel estimates. The optimal combining weights are then given by:

$$w_f = \langle v_f v_f^H \rangle^{-1} \langle v_f h_f^H \rangle \quad (17)$$

$$= \begin{pmatrix} 1+\sigma^2 & R^*(1) \\ R(1) & 1+\sigma^2 \end{pmatrix}^{-1} \begin{pmatrix} R^*(f) \\ R(1-f) \end{pmatrix}$$

$$= \frac{1}{(1+\sigma^2)^2 - |R(1)|^2} \begin{pmatrix} 1+\sigma^2 & -R^*(1) \\ -R(1) & 1+\sigma^2 \end{pmatrix} \begin{pmatrix} R^*(f) \\ R(1-f) \end{pmatrix}$$

$$= \frac{1}{(1+\sigma^2)^2 - |R(1)|^2} \begin{pmatrix} (1+\sigma^2)R^*(f) - R^*(1)R(1-f) \\ (1+\sigma^2)R(1-f) - R(1)R^*(f) \end{pmatrix}$$

where $\sigma^2$ now denotes the variance of the estimation error. As a sanity check, it is assumed that smoothened channel estimates have been obtained, i.e., it is assume that $\sigma^2=0$ (no estimation noise). It is further assumed that the two estimates of the smoothened channel estimates are not fully correlated, i.e., $|R(1)|<1$. Then, the optimal combining vector directly becomes:

$$w_f = \frac{1}{1-|R(1)|^2} \begin{pmatrix} R^*(f) - R^*(1)R(1-f) \\ R(1-f) - R(1)R^*(f) \end{pmatrix} \quad (18)$$

which in turn means that $$w_0 = \begin{pmatrix} 1 \\ 0 \end{pmatrix} \text{ and } w_1 = \begin{pmatrix} 0 \\ 1 \end{pmatrix} \quad (19)$$

as expected. Now, it is assumed that the channel includes a single path delayed by d seconds. In this case the frequency correlation function is given by:

$$R(\Delta f) = \exp(-j2\pi d\Delta f) \quad (20)$$

which in turn means that optimal combining vector can be expressed by:

$$w_f = \frac{1}{(1+\sigma^2)^2 - |R(1)|^2} \begin{pmatrix} (1+\sigma^2)R^*(f) - R^*(1)R(1-f) \\ (1+\sigma^2)R(1-f) - R(1)R^*(f) \end{pmatrix} \quad (21)$$

$$= \frac{1}{(1+\sigma^2)^2 - |R(1)|^2}$$

$$\begin{pmatrix} (1+\sigma^2)\exp(j2\pi df) - \exp(j2\pi d)\exp(-j2\pi d(1-f)) \\ (1+\sigma^2)\exp(-j2\pi d(1-f)) - \exp(-j2\pi d)\exp(j2\pi df) \end{pmatrix}$$

$$= \frac{1}{\sigma^2(2+\sigma^2)} \begin{pmatrix} \sigma^2 \exp(j2\pi df) \\ \sigma^2 \exp(-j2\pi d(1-f)) \end{pmatrix}$$

$$= \frac{1}{(2+\sigma^2)} \begin{pmatrix} \exp(j2\pi df) \\ \exp(-j2\pi d(1-f)) \end{pmatrix}$$

In case the smoothened channel estimates have been estimated without any noise, the optimal combining vector becomes:

$$\lim_{\sigma^2 \to 0} w_f = \frac{1}{2} \begin{pmatrix} \exp(j2\pi df) \\ \exp(-j2\pi d(1-f)) \end{pmatrix} \quad (22)$$

Hence, in case of a single delayed path and no estimation noise, the interpolated channel estimate at frequency f is given as the average of $h_0$ phase changed by $-2\pi df$ and $h_1$ phase changed by $2\pi d(1-f)$. This is as expected as this combiner would realize the maximum processing gain possible given the available data.

Figures 2A, 2B:
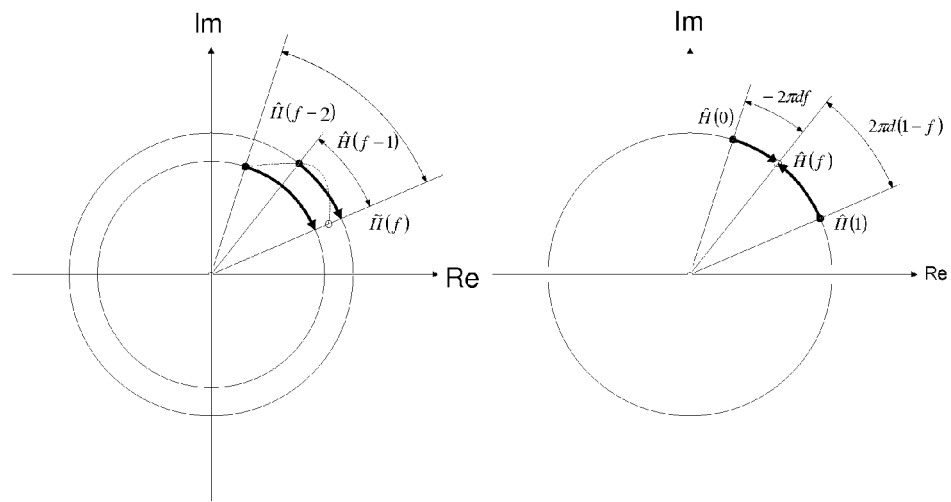
FIG. 2 shows complex diagrams indicating a smoothing effect (left diagram) and an interpolation effect (right diagram) of a recursive channel estimation according to certain embodiments.

FIG. 2 shows complex diagrams illustrating the above described smoothing (left diagram) and interpolation (right diagram) of the proposed IIR based channel estimator according to various embodiments. In this exemplary case the IIR filter is of order 2, i.e., a second-order filter.

In FIG. 2 it is assumed that the argument of the CTF takes on integer values at the pilot locations. This means that in the left diagram (smoothing) only integer valued arguments are considered, whereas in the right diagram (interpolation) the CTF is estimated at non-integer arguments. The left diagram illustrates how two previously smoothened channel estimates (at frequency f−1 and f−2) are combined with the raw channel estimates at frequency f in order to obtain the forward smoothened channel estimate at frequency f. The right diagram illustrates how two nearest surrounding smoothened channel estimates (here assumed to be located at frequency 0 and 1) are used for estimating the CTF at frequency f.

Now, a family of functions is described, which can be utilized for adapting the IIR filter according to the channel conditions. As already mentioned earlier, the Wiener or LMMSE solution for optimal (in the MSE sense) frequency estimation is a function of the frequency correlation function and the SNR. In the following an exemplary case of a first order IIR filter is considered. However, it is straight-forward to a person skilled in the art how to apply these principles to a higher order IIR filter, e.g., the IIR filter described in the previous sections.

It is considered that the forward and/or backward smoothing IIR filter is given by:

$$\vec{h}_f = \lambda e^{j\theta_1} \vec{h}_{f-\Delta f} + (1-\lambda)\tilde{h}_f \in \text{pilot locations}$$

$$\overleftarrow{h}_f = \lambda e^{-j\theta_1} \overleftarrow{h}_{f+\Delta f} + (1-\lambda)\tilde{h}_f$$

$$\hat{h}_f = \tfrac{1}{2}(\vec{h}_f + \overleftarrow{h}_f) \quad (23)$$

where $\Delta f$ denotes the pilot separation. As already mentioned above, one choice of the phase change could be $\theta_1 = \angle R(\Delta f)$. Formally, this choice is optimal provided that the channel includes a single delayed path. Hence, the first step is to verify that this choice can also be applied to a case where the channel has non-zero delay-spread.

Initially, the frequency change rate $\xi$ of the CTF can be defined as:

$$\xi = \log_{10}(\Delta f \tau_{rms}) \quad (24)$$

where $\Delta f$ denotes the frequency separation between pilot sub-carriers and $\tau_{rms}$ denotes the rms delay spread.

Although there seems to be some differences at the case where the SNR is very low, it is indeed possible to obtain the minimum MSE using the true value of the channel change rate. For high channel change rates the minimum MSE becomes more distinct and in this case there seems to be a good agreement between the true channel change rate and the channel change rate used in the IIR filter.

Now, the optimal forgetting factor $\lambda$ is derived as a function of the SNR and the channel change rate $\xi$. Here, use can be made of the approximation $\theta_1 = \angle R(\Delta f)$ which means that the phase change is assumed known given knowledge of the channel change rate. It can be shown that the value of the optimal forgetting factor tends to decrease as the channel change rate increases. Likewise, the optimal forgetting factor tends to decreases as the SNR increases.

In case the frequency correlation $R(\Delta f)$ approaches zero, it could be expected that the gain in combining previously estimated channel estimates with a new observation would tend to vanish. In that case it could be expected that the optimal filter would be given by the classical LMMSE solution, viz.

$$h_f^{LMMSE} = \frac{1}{1+\sigma^2} h_f \quad (25)$$

Translating this solution into the definition of $\lambda$ means that in this case it could be expected that the forgetting factor $\lambda$ approaches:

$$\lambda_{-\infty} = 1 - \frac{1}{1+\sigma^2} = \frac{\sigma^2}{1+\sigma^2} = \frac{1}{SNR+1} \quad (26)$$

when the channel change rate approaches minus infinity. It can be shown that for very high delay spread there is a good agreement between the optimal forgetting factor found by simulation and the predicted forgetting factor. What remains is now to parameterize the optimal forgetting factor in terms of both the SNR and the channel change rate.

The idea is to modify the SNR into an effective filter SNR which is an SNR used to set up the forgetting factor in the IIR filter. The effective filter SNR should behave in such a way that it increases as the channel selectivity increases. Based on this the following functional form for the forgetting factor is proposed:

$$\lambda(SNR_{dB}, \Delta f \tau_{rms}) = \frac{1}{1+\alpha SNR^\alpha} = \frac{1}{1+\alpha 10^{\alpha SNR\_dB/10}} \quad (27)$$

where $\alpha(\xi)$ is a gain modifier that depends on the channel change rate. The gain modifier can be modelled as a logarithmic function:

$$\log\alpha(\xi) = -c_0 \log(1+\exp(-c_1(\xi+c_2))) \quad (28)$$

$$= -\frac{\phi}{c_1}\log(1+\exp(-c_1(\xi+c_2)))$$

where $\phi$, $c_1$ and $c_2$ are constants to be determined. Based on the simulated results the slope $\phi$ and offset $c_2$ can be derived, which yields:

$$\log\alpha(\xi) = -\frac{1}{c_1}\log(1+\exp(-c_1(\xi+0.5))) \quad (29)$$

where $c_1$ is a transition parameter that controls the transition rate between the linear regime and the non-linear regime. As an example, the transition parameter could be set to $c_1=10$. Finally, it can be shown that this expression of the gain modifier is almost identical to:

$$\alpha(\Delta f \tau_{rms}) = (1+(\pi\Delta f \tau_{rms})^{-c_1/\log(10)})^{-1/c_1} \quad (30)$$

In the following, processing in the time domain is described. According to the theory of optimal linear estimation, optimal (in the MSE sense) time smoothing can be based on a real valued filter. Hence, the following simple approach for time processing is proposed, which alleviates the need for large buffers.

Essentially this is just a time equivalent of the frequency smoother described above.

Let $\tilde{h}_t$ denote the most current channel estimate (from the frequency processing) at time t. In order to ease the notation, the sub-carrier index has been suppressed. It is assumed that the time filtered channel estimate $S_{t-\Delta_t}$ at time $t-\Delta_t$ has been obtained, where $\Delta_t$ denotes the time-difference between the current pilot symbol at time t to the previous pilot symbol. The time filtered channel estimate at time t is then given as:

$$s_t = \lambda^{66t} s_{t-\Delta_t} + (1-\lambda^{\Delta_t}) \tilde{h}_t \quad (31)$$

where $\lambda$ is the temporal forgetting factor which in part (but not exclusively) will be a function of both the SNR and coherence time. After the filtered channel estimate has been obtained at time t it can be linearly interpolated between the channel estimates at time $t-\Delta_t$ and t in order to obtain the final channel estimates viz.

$$h_{t-(\Delta_t-\xi)} = s_{t-\Delta_t} + \frac{s_t - s_{t-\Delta_t}}{\Delta_t} \xi, \xi = 0, 1, 2, \ldots, \Delta_t \quad (32)$$

One advantage of this procedure is that it alleviates the need for a large buffer, since all that needs to be stored is the estimated CTF at the last pilot symbol. The described estimation can be straightforwardly extended to the case where the final channel estimates depend on even older as well as future estimates of the CTF. In that case a set of forward and backward recursions are provided, similar to those described for the above frequency IIR filter.

In practical implementations the OFDM receiver may optionally also contain a timing correction loop, a frequency correction loop (AFC) as well as a gain control unit (AGC). The time and frequency updates made by these receiver subsystems have to be taken into account by the time processing of the channel estimates.

Figure 3A:
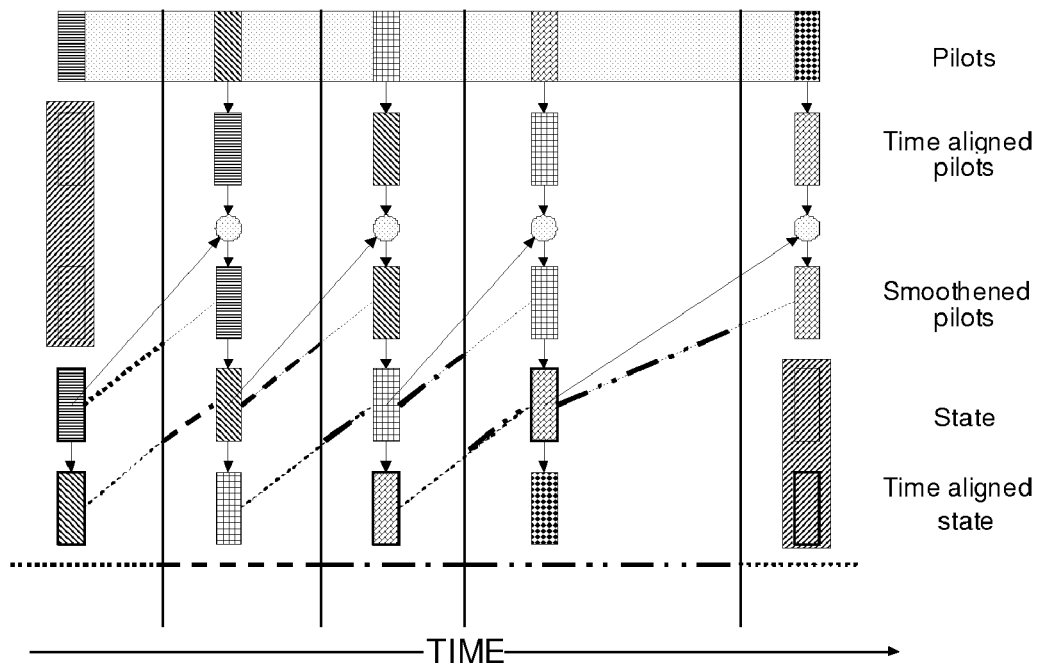
FIG. 3 shows an illustration of the influence that pre-FFT timing adjustment has on channel estimation, according to an exemplary embodiment.
Figure 3B:
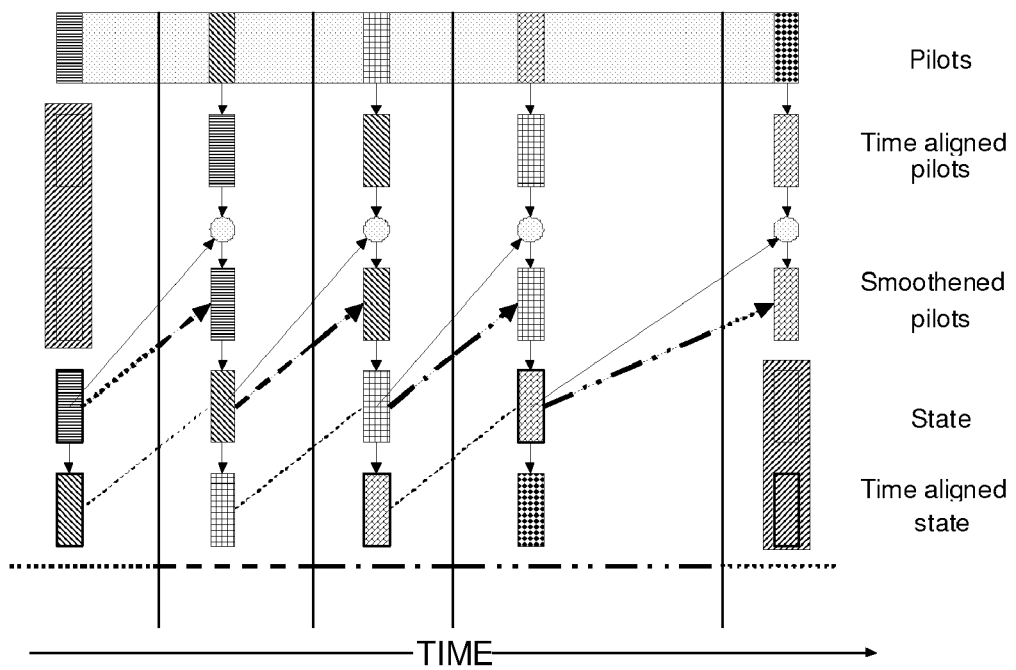

FIGS. 3A and 3B illustrate the influence that pre-FFT timing adjustment has on channel estimation. The case of offline (i.e., interpolation—buffering required) and online (i.e., extrapolation—no buffering required) channel estimation is shown in FIG. 3A and FIG. 3B, respectively. The diagrams of FIGS. 3A and 3B are to be read in the following way. The line and filling patterns illustrate the pre-FFT timing used for the input and output of the channel estimator. New incoming pilots are symbolized as patterned boxes in the 1st row (enumerated from the top). In the 2nd row a new pilot is aligned with the previous pilot. In the 3rd row a time smoothened pilot is obtained using the new time aligned pilot and a state (shown in the 4th row). In the 5th row the updated state is aligned with the next pilot.

The time-processing part of the channel estimator essentially includes two parts: (1) a smoothening part where the most recent channel estimate is smoothened using other estimates (or a history condensed into a state) and (2) a interpolation or extrapolation part where the smoothened estimates are used to estimate the CTF outside pilot symbols. In the smoothening part the time-definition of the most current pilot symbol is aligned with that used for the current history state.

The interpolation or extrapolation part is based on the smoothened channel estimate and the history state. In the online case of FIG. 3B the output from extrapolation is time-corrected so that it is aligned with the pre-FFT timing used at any given time. It is noted that the offline case of FIG. 3A could be implemented in a similar way which effectively would remove the lower row from the figure. When a new channel estimate (pilot) is encountered the smoothened channel estimate is promoted (after proper time-alignment) to history state.

Likewise, it is possible to take into account the effect that a frequency update has on the temporal evolution of the channel transfer function. Again, reference is made to FIGS. 3A and 3B. Instead of a pre-FFT timing adjustment a case is considered where frequency updates occur in between two pilot symbols. To be more specific, it is assumed that the time filtered channel estimate $s_{t-\Delta_t}$ at time $t-\Delta_t$ has already been obtained, where $\Delta_t$ denotes the time-difference between the current pilot symbol at time t and the previous pilot symbol. During time $\Delta_t$ between the two pilot symbols the frequency has been changed by the amount $\Delta_f$. The time filtered channel estimate at time t is then given as:

$$s_t = \lambda^{\Delta_t} e^{j2\pi\Delta_f \Delta_t} s_{t-\Delta_t} + (1-\lambda^{\Delta_t}) \tilde{h}_t \quad (33)$$

since the frequency change will result in a time-dependent phase-change of the channel transfer function. Linear interpolation is then carried out on the time filtered channel estimates taking into account the time-dependent phase-change, viz.

$$\hat{h}_{t-(\Delta_t-\xi)} = \left( s_{t-\Delta_t} + \frac{s_t e^{-j2\pi\Delta_f \Delta_t} - s_{t-\Delta_t}}{\Delta_t} \xi \right) e^{j2\pi\Delta_f \xi}, \xi = 0, 1, 2, \ldots, \Delta_t \quad (34)$$

It is straightforward to a person skilled in the art how to apply the same principles to accommodate the temporal effects due to automatic gain control (AGC) updates. One simple way of dealing with this case could simply be to clear the history state when an AGC update occurs, i.e., it is started all over and previous estimates are not used. Alternatively, if access is given to the applied gain step then this information can be used to align the gain of the history state with the gain of the new estimate in a similar manner as described for the above timing-update and AFC case.

Figure 4:
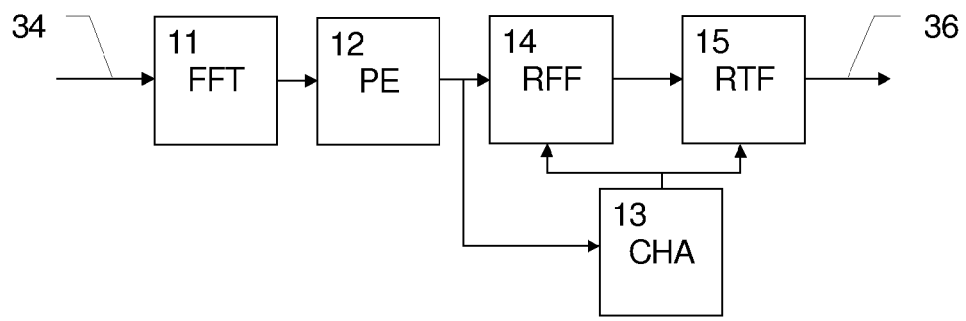
FIG. 4 shows a schematic block diagram of a multi-carrier receiver part according to one embodiment.

FIG. 4 shows a schematic block diagram of a receiver part of an OFDM transceiver according to a first embodiment, which can be implemented as a electric circuitry, an integrated chip, a chip set or a receiver module.

A sampled radio frequency (RF) signal 34 supplied from an RF front end (not shown) is FFT processed in an FFT stage 11 and the FFT processed samples are processed in a pilot estimation (PE) stage 12 to estimate channel values at pilot locations to be used for channel estimation processing in stages 13 to 15. More specifically, the estimated values at the pilot locations are processed in a recursive frequency domain filter stage (RFF) 14 for executing the above described frequency domain processing and then in a recursive time domain filter stage (RTF) 15 for executing the above described time domain processing. Both frequency and time domain filter stages 14, 15 are controlled by a channel adaptation stage 13 configured to adapt the frequency and time domain filter stages 14, 15 to channel conditions or parameters derived from the pilots and/or other channel control signalling. Thus, at the output a final time-frequency channel estimate 36 is obtained.

It is noted that, in an alternative embodiment, the locations or order of the recursive frequency domain and time domain filter stages 14, 15 could be exchanged as well. Thus, time domain filtering could be performed prior to frequency domain filtering.

Figure 5:
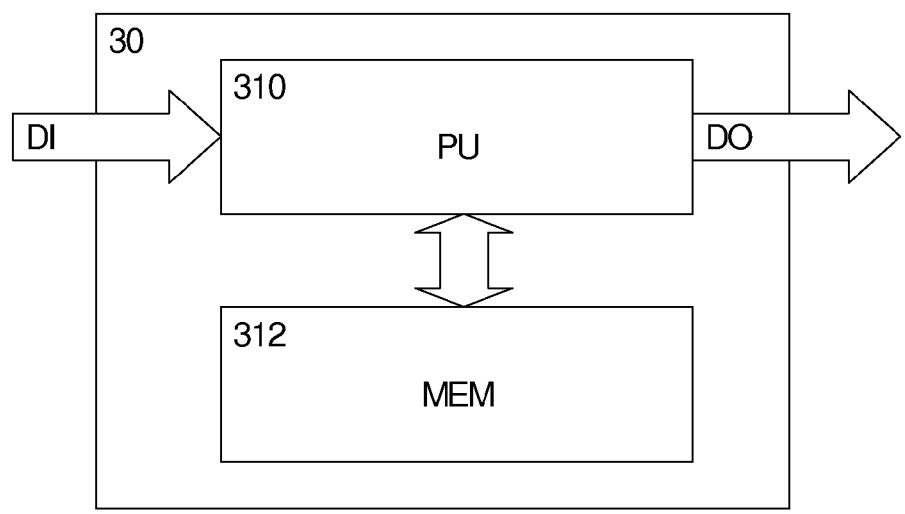
FIG. 5 shows a schematic block diagram of a software-based implementation according to one embodiment.

FIG. 5 shows a schematic block diagram of a software-based implementation of the proposed channel estimation mechanism according to a second embodiment. Here, a receiver 30, which may be an integrated chip, a chipset or module, comprises a processing unit 310, which may be any processor or computer device with a control unit which performs control based on software routines of a control program stored in a memory 312. Program code instructions are fetched from the memory 312 and are loaded to the control unit of the processing unit 310 in order to perform the estimation processing steps described above and later in connection with FIGS. 6 and 8. The processing steps may be performed on the basis of input data DI and may generate output data DO, wherein the input data DI may correspond to the RF samples received from the RF front end and the output data DO may correspond to the time-frequency values of the channel estimation result.

Figure 6:
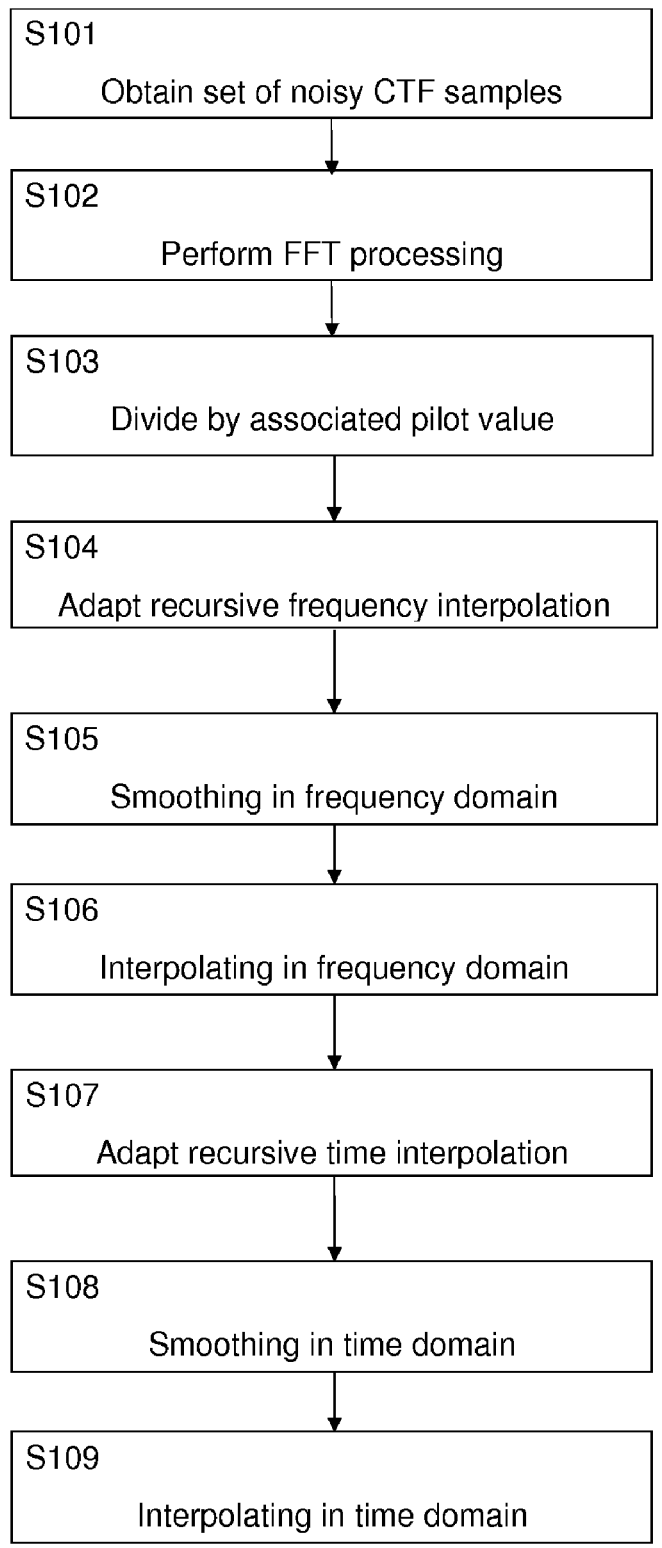
FIG. 6 shows a flow diagram of a channel estimation procedure according to one embodiment.

FIG. 6 shows a flow diagram of a channel estimation procedure according to a third embodiment.

In step S101 a set of noisy CTF samples is obtained from samples at predetermined pilot locations. Then, in step S102, an FFT processing is performed and each processed CTF sample is divided in step S103 by its associated initial pilot value to derive CTF estimates at pilot locations. Then, in step S104, a recursive frequency interpolation (or extrapolation or smoothing) filtering processing is adapted to the channel conditions, as described above. In step S105, a smoothing processing in the frequency domain is executed by using the adapted filtering processing as described above, and in step S106 an interpolation or extrapolation in the frequency domain is executed by using the adapted filtering processing as described above. Subsequently, in step S107, a recursive time interpolation (or extrapolation or smoothing) filtering processing is adapted to the channel conditions, as described above. Then, in step S108, a smoothing processing in the time domain is executed by using the adapted filtering processing as described above, and in step S109 an interpolation or extrapolation in the time domain is executed by using the adapted filtering processing as described above.

Also in this embodiment, the time domain processing steps 107 to 109 may alternatively be executed prior to the frequency domain processing steps 104 to 106, so that time domain filtering is performed prior to frequency domain filtering.

Thus, a low-complexity approach for performing time-frequency channel estimation is provided. This means that the computational burden of channel estimation is reduced compared to earlier solutions. This indicates that power consumption of a modem or receiver can be reduced or alternatively the freed computational resources can be used to improve performance, e.g., by utilizing iterative approaches such as data-assisted channel estimation. Furthermore, aggressive time-averaging can be done without incurring an increase in memory. This is especially useful in low mobility scenarios.

In the above embodiments, an IIR-based smoothing or interpolation or extrapolation procedure has been described, which can be applied e.g., for time division duplex (TDD) operation of an OFDM based transceiver system. TDD is characterized by the same set of frequencies being used for both uplink and downlink transmissions; that is, during uplink transmission the receiver of a terminal device, e.g., mobile station (MS), does not receive pilots. Therefore the distance in time between two (downlink transmission) time positions that contain pilot locations is typically significantly longer if there is a period with uplink transmission in between the time positions with pilot locations than if there is no uplink transmission period in between.

Thus, a computationally efficient way of improving interpolation based channel and noise covariance estimation in a TDD (Time Division Duplex) OFDM based transceiver system is provided. In a typical OFDM based transceiver system the channel transfer function and noise covariance are sampled at a given set of time-frequency positions known as pilot locations. The task of the channel estimator is then to infer the entire channel transfer function at all relevant time-frequency positions given the sampled values at the pilot locations. Similarly, the task of the noise covariance estimator is to infer the noise covariance at all relevant time-frequency positions given the noise covariance that is estimated at the pilot locations. Typically, the inference of channel and noise covariance estimates between pilot locations is first performed in the frequency domain at a given time position, extending the estimates to cover all relevant frequencies at that time position. Then, smoothing of these estimates is performed across the time positions that carry pilot locations. Finally, the estimates of the channel transfer function and of the noise covariance are extended (by interpolation or other reconstruction method) to the time positions that do not contain pilot locations.

In the fourth embodiment, a solution to the above problem of non-equal inter pilot durations is proposed. In an OFDM based transceiver system that is operated in TDD mode the set of frequencies that modulate an OFDM symbol is being used for both uplink and downlink transmission. Either all frequencies are used for uplink transmission (transmission from MS to BS (Base Station))) during a particular OFDM symbol period (time position) or all frequencies are used for downlink transmission (transmission from BS to MS). An OFDM symbol period equals the time that it takes to transmit a single OFDM symbol including the cyclic prefix (CP) guard time as shown in FIG. 1.

Figure 7:
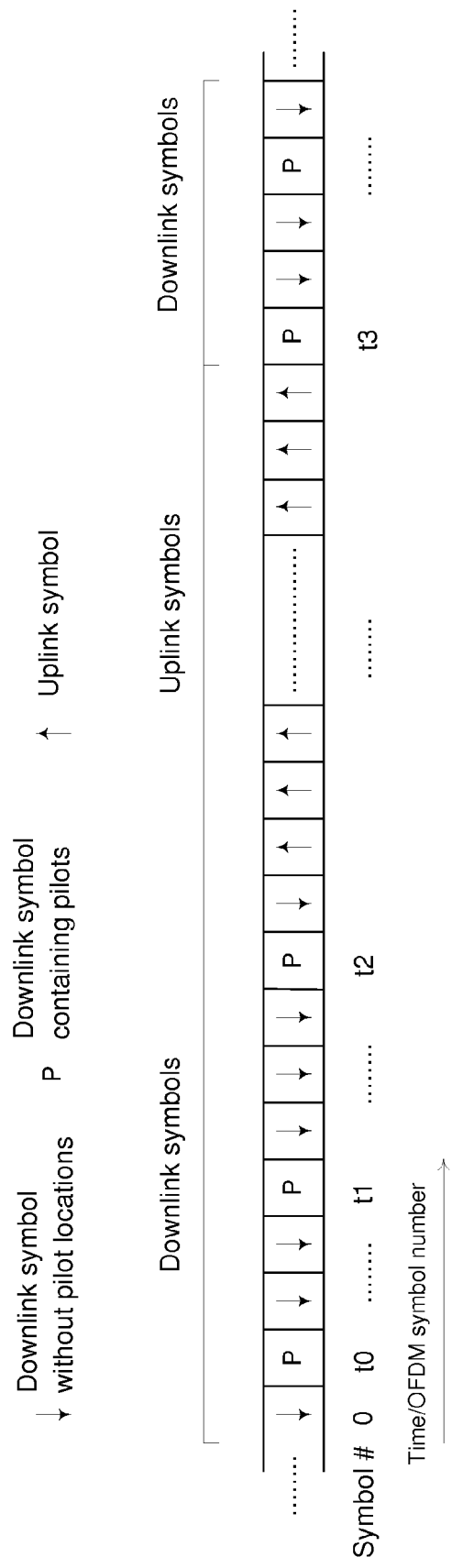
FIG. 7 shows an example of a TDD operation mode of a multi-carrier transceiver system.

FIG. 7 shows an example of how the OFDM symbols can be distributed between uplink transmission and downlink transmission. According to FIG. 7, a series of OFDM symbol periods is shown, which make up a period with downlink transmission followed by a period (of arbitrary length) of uplink transmission followed by another period of downlink transmission. In the downlink periods the OFDM symbols that contain pilot locations are indicated by a "P". The pilots are a set of transmitted constellation points that are known at the receiver side and thus can be used to estimate the channel transfer function and the noise covariance, as described in connection with the first to third embodiment.

A characteristic of the TDD mode of operation is that while the distance in time between OFDM symbols containing pilot locations is relatively short during continuous downlink transmission, the distance in time between two symbols containing pilot locations can be very long when the pilot symbols are separated by a period with uplink transmission.

The channel and noise covariance estimates at the frequencies of a symbol that contains pilot locations are typically first extended/inferred to all frequencies for that time position/symbol. Let $h_{t,f}$ denote the estimate of the channel transfer function at time position/symbol t for frequency f and let $C_{t,f}$ denote the corresponding noise covariance estimate. In the following we will assume that we have available the estimates $h_{t,f}$ and $C_{t,f}$ for all frequencies at the time positions corresponding to the OFDM symbols containing pilots (e.g., corresponding to the time positions/symbol numbers t0, t1, t2 and t3 in FIG. 7).

Estimates of the channel transfer function and noise covariance for the downlink OFDM symbols that do not contain pilot locations (squares with a ↓ arrow in FIG. 7) are typically obtained by some form of interpolation method. Prior to performing this interpolation it is beneficial for noise reduction purposes to filter the estimates $h_{t,f}$ and $C_{t,f}$ by a temporal smoothing method.

One method for temporal smoothing is to perform IIR (Infinite Impulse Response) filtering of the estimates, as described above in connection with the first to third embodiment. Let $h_{t,f}$ denote the channel estimate at the most recently received OFDM symbol t with pilot locations and let $\Delta_t$ denote the time difference (measured in number of OFDM symbol periods) to the previous OFDM symbol that contained pilot locations. The time filtered/smoothed channel estimates $\tilde{h}_{t,f}$ at symbol time position t are now calculated as:

$$\tilde{h}_{t,f} = \lambda_h^{\Delta_t} \tilde{h}_{t-\Delta_t,f} + (1-\lambda_h^{\Delta_t}) \cdot h_{t,f} \quad (35)$$

where $\lambda_h$ is the temporal forgetting factor for the channel estimates, $0 \leq \lambda_h < 1$. Similarly the time filtered/smoothed noise covariance estimates $\tilde{C}_{t,f}$ at symbol time position t are calculated as:

$$\tilde{C}_{t,f} = \lambda_C^{\Delta_t} \cdot \tilde{C}_{t-\Delta_t,f} + (1-\lambda_C^{\Delta_t}) \cdot C_{t,f} \quad (36)$$

where $\lambda_C$ is the temporal forgetting factor for the noise covariance estimates, $0 \leq \lambda_C < 1$. The forgetting factors $\lambda_h$ and $\lambda_C$ determine the influence or 'weight' that previous estimates have compared to the current estimate on the resulting smoothed estimate. Larger values of $\lambda_h$ and $\lambda_C$ put larger weight on the previous estimate and less weight on the current estimate which is typically appropriate for low speeds of the MS where the transmission channel conditions change slowly. Smaller values of $\lambda_h$ and $\lambda_C$ put smaller weight on the previous estimate and larger weight on the current estimate which is typically appropriate for high speeds of the MS where the transmission channel conditions change more rapidly. For all values of $\lambda_h$ and $\lambda_C$ it applies that the larger the time difference $\Delta_t$ to the previous OFDM symbol that contained pilot locations the less weight is put on the previous estimate and the larger the weight that is put on the current estimate.

A strategy for selecting the values of the forgetting factors is to use values for $\lambda_h$ and $\lambda_C$ that are fixed and do not change over time. They can be selected so that they pose a good compromise between receiver performance for both low and high speeds of the MS. Advantages of this approach include that it leads to a removal of the need for a complex and possibly computationally expensive algorithm for adaptive estimation of $\lambda_h$ and $\lambda_C$. Furthermore, algorithms for adaptive estimation may require historic measurements of e.g., SNR and coherence time, measurements that typically cannot be made during a period with uplink transmission when the OFDM based transceiver system is operated in TDD mode. The advantages of using fixed values also include a robust receiver design with known behaviour in different operational environments (e.g., transmission channel conditions and speed of the MS). Furthermore, at low speeds of the MS the performance of the receiver can be improved significantly if the effective weight that is being put on estimates $\tilde{h}_{t-\Delta_t,f}$ and $\tilde{C}_{t-\Delta_t,f}$ from before an uplink period is effectively larger than zero. In order for this to be the case the values of $\lambda_h$ and $\lambda_C$ must be rather large.

In the fourth embodiment, one set of fixed forgetting factors $\lambda_{h,D}$ and $\lambda_{C,D}$ is used when smoothing between pilots that are not separated by a period with uplink transmission and another set of fixed forgetting factors $\lambda_{h,U}$ and $\lambda_{C,U}$ is used when smoothing between pilot symbols that are separated by a period with uplink transmission.

An OFDM based transceiver system that is operated in TDD mode where the same set of frequencies that modulate an OFDM symbol is being used for both uplink and downlink transmission is thus configured to use two sets of fixed forgetting factors when performing temporal smoothing by use of an IIR filter of channel transfer function estimates and noise covariance estimates across the time positions of OFDM symbols that carry pilot locations. One set of fixed forgetting factors is used when smoothing between pilot symbols that are not separated by an uplink transmission period (continuous downlink transmission). The other set of fixed forgetting factors is used when smoothing between pilot symbols that are separated by a period with uplink transmission.

Figure 8:
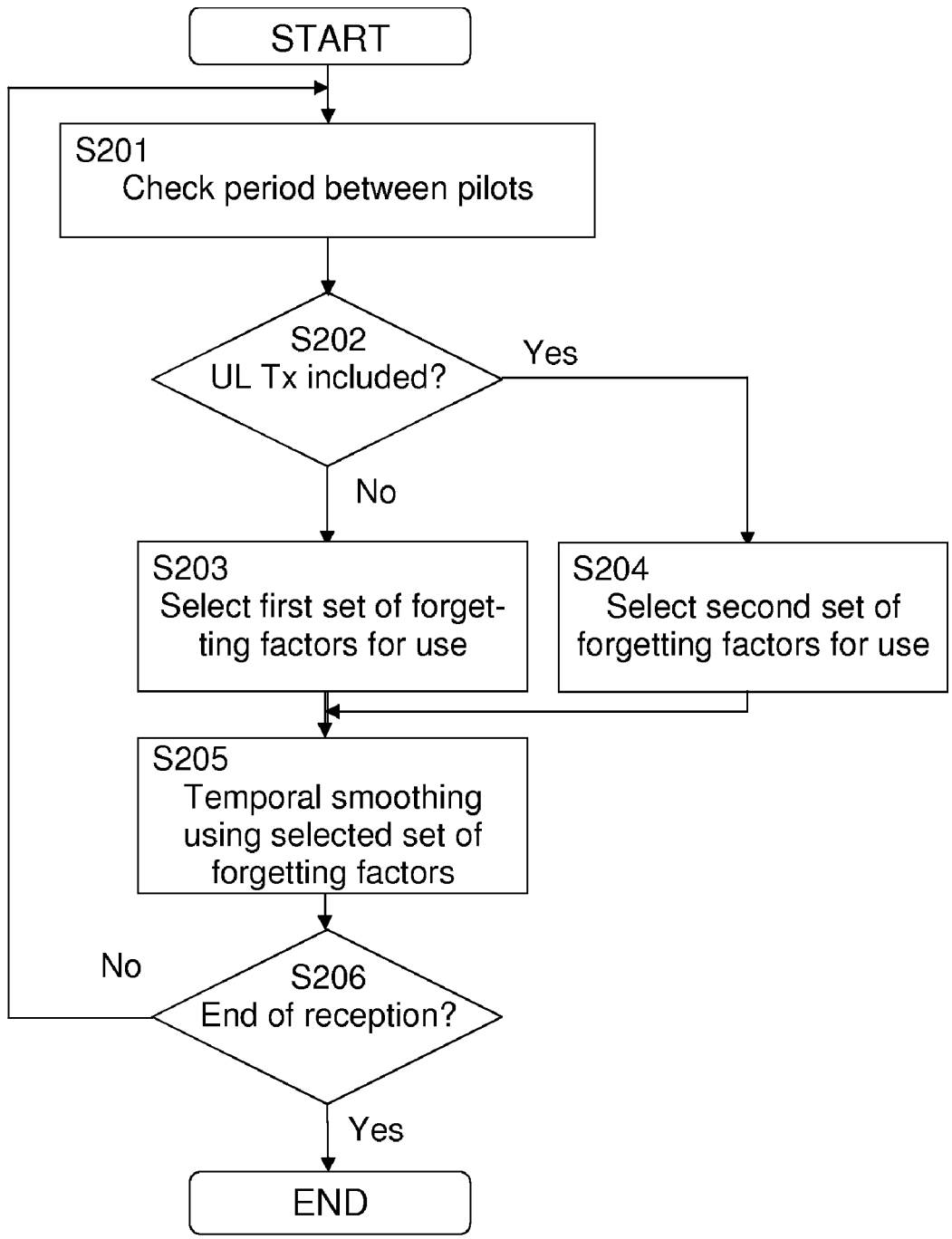
FIG. 8 shows a flow diagram of a channel estimation smoothing procedure according to one embodiment.

FIG. 8 shows a flow diagram of an estimation procedure according to the fourth embodiment.

Let $h_{t,f}$ denote the estimate of the channel transfer function at time position/symbol t for frequency f and let $C_{t,f}$ denote the corresponding noise covariance estimate. In the following we will assume that we have available the estimates $h_{t,f}$ and $C_{t,f}$ for all frequencies at the time positions corresponding to the OFDM symbols containing pilot locations (e.g., corresponding to the time positions/symbol numbers t0, t1, t2 and t3 in FIG. 7). For noise reduction purposes smoothing of these estimates can be performed by use of a temporal IIR filter. Let t represent the time position/OFDM symbol number of the most recently received OFDM symbol with pilot locations and let $\Delta_t$ denote the time difference (measured in number of OFDM symbol periods) to the previous OFDM symbol that contained pilot locations.

In step S201 the period between two successive or neighbouring pilot locations is checked, and a decision is made in step S202 as to whether an uplink (UL) transmission period is included.

If it is determined in step S202 that the time period between the neighbouring pilot locations at time positions $t-\Delta_t$ and t does not contain a period with uplink transmission (i.e., during continuous downlink transmission), the procedure continues with step S203 and a first set of forgetting factors is selected for use. Then, in step S205 a temporal smoothing is performed by using the selected set of forgetting factors in order to obtain the smoothed channel transfer function estimates $\tilde{h}_{t,f}$ for all frequencies f at symbol time position t. This can be expressed as follows:

$$\tilde{h}_{t,f} = \lambda_{h,D}^{\Delta_t} \tilde{h}_{t-\Delta_t,f} + (1-\lambda_{h,D}^{\Delta_t}) \cdot h_{t,f} \quad (37)$$

where $\lambda_{h,D}$ is a fixed temporal forgetting factor for the channel estimates, $0 \leq \lambda_{h,D} < 1$. Furthermore, temporal smoothing is performed, where the smoothed noise covariance estimates $\tilde{C}_{t,f}$ for all frequencies f at symbol time position t are calculated as follows:

$$\tilde{C}_{t,f} = \lambda_{C,D}^{\Delta_t} \cdot \tilde{C}_{t-\Delta_t,f} + (1-\lambda_{C,D}^{\Delta_t}) \cdot C_{t,f} \quad (38)$$

where $\lambda_{C,D}$ is a fixed temporal forgetting factor for the noise covariance estimates, $0 \leq \lambda_{C,D} < 1$. $\lambda_{h,D}$ and $\lambda_{C,D}$ is the first set of fixed forgetting factors that is used when smoothing between neighbouring pilot time positions during continuous downlink transmission.

When it is determined in step S202 that the time period between the neighbouring pilot locations at time positions $t-\Delta_t$ and t includes a period with uplink transmission, the procedure branches to step S204 and a second set of forgetting factors is selected for use. Then, the procedures continues with step S205 where the temporal smoothing is performed by using the selected set of forgetting factors in order to obtain the smoothed channel transfer function estimates $\tilde{h}_{t,f}$ for all frequencies f at symbol time position t, which can be calculated as follows:

$$\tilde{h}_{t,f} = \lambda_{h,U}^{\Delta_t} \tilde{h}_{t-\Delta_t,f} + (1-\lambda_{h,U}^{\Delta_t}) \cdot h_{t,f} \quad (39)$$

where $\lambda_{h,U}$ is a fixed temporal forgetting factor for the channel estimates, $0 \leq \lambda_{h,U} < 1$. The smoothed noise covariance estimates $\tilde{C}_{t,f}$ for all frequencies f at symbol time position t can be calculated as follows:

$$\tilde{C}_{t,f} = \lambda_{C,U}^{\Delta_t} \cdot \tilde{C}_{t-\Delta_t,f} + (1-\lambda_{C,U}^{\Delta_t}) \cdot C_{t,f} \quad (40)$$

where $\lambda_{C,U}$ is a fixed temporal forgetting factor for the noise covariance estimates, $0 \leq \lambda_{C,U} < 1$. $\lambda_{h,U}$ and $\lambda_{C,U}$ is the second set of fixed forgetting factors that is used when smoothing between neighbouring pilot time positions that are separated by a period with uplink transmission.

Finally, in step S206 it is checked whether end of reception has been reached. If so, the procedure ends. Otherwise, if further reception data is available, the procedure jumps back to step S201 and the above steps are repeated for another data portion.

In the fourth embodiment, a possibly inaccurate and computationally expensive adaptive estimation algorithm for determination of the forgetting factors for temporal channel transfer function and noise covariance estimates can be prevented by use of an IIR filter by keeping the forgetting factors fixed. For ODFM based transceiver systems that are operated in TDD mode the invention improves receiver performance by use of two sets of fixed forgetting factors. In TDD mode an adaptive estimation method for the forgetting factors might have problems just after a period of uplink transmission as it is not possible to obtain the measurements that such a method rely on during the uplink transmission.

To summarize, a method, a computer program product, and an apparatus have been described, which are provided to estimate a channel of a multi-carrier transmission by splitting an interpolation or extrapolation or smoothing of estimates into a frequency domain part and a time domain part, wherein the channel estimation unit is configured to use for both the frequency domain part and the time domain part respective recursive filters, and wherein at least one of said recursive filters is adapted to channel conditions of the multi-carrier transmission.

It is to be noted that the invention is not restricted to the OFDM-based embodiments described above, but can be implemented in various wireless communication systems. In general, other embodiments can be used in any communication system involving temporal smoothing of a channel transfer function and/or noise covariance estimates. Moreover, it is not an essential requirement that all recursive filters are adaptive. As an example, the recursive (e.g., IIR) filter for frequency processing may be adaptive, while the recursive (e.g., IIR) filter for time processing may be kept fixed (i.e., two fixed filters may be provided for the TDD mode). Hence, the adaptive filter functionality (e.g., based on channel condition) for time processing is not an essential feature. The embodiments may thus vary within the scope of the attached claims.

The invention claimed is:

1. A method comprising:
   determining, via at least one processor, to perform channel estimation for a multi-carrier transmission by deriving estimates from raw channel estimates at predetermined pilot locations and subjecting the raw estimates to smoothing and performing an interpolation or extrapolation on the smoothened raw estimates; splitting said interpolation and extrapolation into a frequency domain part and a time domain part;
   determining, via the at least one processor, to use for both said frequency domain part and said time domain part respective recursive filters; and
   determining to adapt at least one of said recursive filters to channel conditions of said multi-carrier transmission.

2. The method according to claim 1, wherein said recursive filters are infinite impulse response poly-phase filters.

3. The method according to claim 1, further comprising configuring said recursive filter for said frequency domain part to have complex valued filter coefficients.

4. The method according to claim 1, further comprising determining to use a timing estimator to derive a signal portion from which said estimates are derived.

5. The method according to claim 1, wherein said smoothing comprises a forward recursive smoothing of raw channel estimates.

6. The method according to claim 1, wherein said determining to adapt comprises deriving a forgetting factor of said recursive filter of said frequency domain part from at least one of a channel change rate and a channel quality parameter.

7. The method according to claim 6, further comprising parameterizing said forgetting factor in terms of at least one of said channel change rate and said channel quality parameter.

8. The method according to claim 1, wherein said determining to adapt comprises deriving a forgetting factor of said recursive filter of said time domain part from at least one of a coherence time and a channel quality parameter.

9. The method according to claim 8, further comprising determining to provide at least one first and second forgetting factor for said recursive filter of said time domain part, determining to use said at least one first forgetting factor for smoothing between estimates in one transmission direction which are not separated by a transmission period in the other transmission direction, and determining to use said at least one second forgetting factor for smoothing between estimates in said one transmission direction which are separated by a transmission period in said other transmission direction.

10. The method according to any one of the preceding claims, further comprising performing said interpolation or said extrapolation in said time domain on time filtered channel estimates taking into account at least one of a time-dependent phase change and a gain change.

11. An apparatus comprising:
    at least one processor; and
    at least one memory including computer program code for one or more programs, the at least on memory and the computer program code configured to, with the at least one processor, cause the apparatus to perform at least the following:
    cause, at least in part, an estimate of a channel of a multi-carrier transmission by deriving estimates from raw channel estimates at predetermined pilot locations and subjecting the raw estimates to smoothing and performing an interpolation or extrapolation on the smoothened raw estimates;
    cause, at least in part, splitting said interpolation and extrapolation into a frequency domain part and a time domain part,
    wherein said apparatus is further caused to use for both said frequency domain part and said time domain part respective recursive filters, and wherein at least one of said recursive filters is adapted to channel conditions of said multi-carrier transmission.

12. The apparatus according to claim 11, wherein said recursive filters are infinite impulse response poly-phase filters.

13. The apparatus according to claim 11, wherein said recursive filter for said frequency domain part is configured to have complex valued filter coefficients.

14. The apparatus according to claim 11, wherein said apparatus is further caused to use a timing estimator to derive a signal portion from which said estimates are derived.

15. The apparatus according to claim 11, wherein apparatus is further caused to perform a forward recursive smoothing of raw channel estimates.

16. The apparatus according to claim 11, wherein said apparatus is further caused to derive a forgetting factor of said recursive filter of said frequency domain part from at least one of a channel change rate and a channel quality parameter.

17. The apparatus according to claim 16, wherein said apparatus is further caused to parameterize said forgetting factor in terms of at least one of said channel change rate and said channel quality parameter.

18. The apparatus according to claim 11, wherein said apparatus is further caused to derive a forgetting factor of said recursive filter of said time domain part from at least one of a coherence time and a channel quality parameter.

19. The apparatus according to claim 18, wherein said apparatus is further caused to provide at least one first and second forgetting factor for said recursive filter of said time domain part, using said at least one first forgetting factor for smoothing between estimates in one transmission direction which are not separated by a transmission period in the other transmission direction, and using said at least one second forgetting factor for smoothing between estimates in said one transmission direction which are separated by a transmission period in said other transmission direction.

20. The apparatus according to claim 11, wherein said apparatus is further caused to perform said interpolation or said extrapolation in said time domain on time filtered channel estimates taking into account at least one of a time-dependent phase change and a gain change.

21. The apparatus according to claim 11, wherein the apparatus comprises a terminal device.

22. The apparatus according to claim 11, wherein the apparatus comprises a receiver module.

23. The apparatus according to claim 11, wherein the apparatus comprises a chip device.

24. A computer program product comprising at least one non-transitory computer-readable storage medium having computer-readable program instructions stored therein, the computer-readable program instructions comprising:
 a program instruction for determining to perform channel estimation for a multi-carrier transmission by deriving estimates from raw channel estimates at predetermined pilot locations and subjecting the raw estimates to smoothing and performing interpolation or extrapolation on the smoothened raw estimates;
 a program instruction for splitting said interpolation and extrapolation into a frequency domain part and a time domain part;
 a program instruction for determining to use for both said frequency domain part and said time domain part respective recursive filters; and
 a program instruction for determining to adapt at least one of said recursive filters to channel conditions of said multi-carrier transmission.

25. A method comprising:
 determining, via at least one processor, to perform channel estimation for a multi-carrier transmission by splitting an interpolation or extrapolation or smoothing of estimates into a frequency domain part and a time domain part;
 determining, via the at least one processor, to use for both said frequency domain part and said time domain part respective recursive filters;
 determining to adapt at least one of said recursive filters to channel conditions of said multi-carrier transmission by deriving a forgetting factor of said recursive filter of said time domain part from at least one of a coherence time and a channel quality parameter; and
 determining to provide at least one first and second forgetting factor for said recursive filter of said time domain part, using said at least one first forgetting factor for smoothing between estimates in one transmission direction which are not separated by a transmission period in the other transmission direction, and using said at least one second forgetting factor for smoothing between estimates in said one transmission direction which are separated by a transmission period in said other transmission direction.

26. An apparatus comprising:
 at least one processor; and
 at least one memory including computer program code for one or more programs, the at least on memory and the computer program code configured to, with the at least one processor, cause the apparatus to perform at least the following:
 cause, at least in part, an estimate of a channel of a multi-carrier transmission by splitting an interpolation or extrapolation or smoothing of estimates into a frequency domain part and a time domain part and to derive a forgetting factor of said recursive filter of said time domain part from at least one of a coherence time and a channel quality parameter, wherein said apparatus is further caused to use for both said frequency domain part and said time domain part respective recursive filters, and wherein at least one of said recursive filters is adapted to channel conditions of said multi-carrier transmission, and wherein said apparatus is further caused to provide at least one first and second forgetting factor for said recursive filter of said time domain part, using said at least one first forgetting factor for smoothing between estimates in one transmission direction which are not separated by a transmission period in the other transmission direction, and wherein said apparatus is further caused to use said at least one second forgetting factor for smoothing between estimates in said one transmission direction which are separated by a transmission period in said other transmission direction.

* * * * *